United States Patent
Shan et al.

(10) Patent No.: US 10,233,060 B2
(45) Date of Patent: Mar. 19, 2019

(54) SWITCHING VALVE, SWITCHING HYDRAULIC SYSTEM AND CRANE

(71) Applicant: Xuzhou Heavy Machinery Co., Ltd., Xuzhou (CN)

(72) Inventors: Zenghai Shan, Xuzhou (CN); Shouwei Wang, Xuzhou (CN); Yinmei Ren, Xuzhou (CN); Lei Zhao, Xuzhou (CN); Houbao Qi, Xuzhou (CN); Dong Wang, Xuzhou (CN)

(73) Assignee: XUZHOU Heavy Machinery Co., LTD., Xuzhou (CN)

( * ) Notice: Subject to any disclaimer, the term of this patent is extended or adjusted under 35 U.S.C. 154(b) by 0 days.

(21) Appl. No.: 15/555,407

(22) PCT Filed: Mar. 3, 2016

(86) PCT No.: PCT/CN2016/075399
§ 371 (c)(1),
(2) Date: Sep. 1, 2017

(87) PCT Pub. No.: WO2016/138865
PCT Pub. Date: Sep. 9, 2016

(65) Prior Publication Data
US 2018/0037447 A1    Feb. 8, 2018

(30) Foreign Application Priority Data

Mar. 4, 2015   (CN) .......................... 2015 1 0096747

(51) Int. Cl.
*B66D 1/08*   (2006.01)
*F16K 31/124*   (2006.01)
(Continued)

(52) U.S. Cl.
CPC .................. *B66D 1/08* (2013.01); *B66D 1/44* (2013.01); *B66F 9/22* (2013.01); *F15B 1/165* (2013.01);
(Continued)

(58) Field of Classification Search
CPC . B66D 1/08; B66D 1/44; F15B 13/027; F15B 13/024; F15B 1/165;
(Continued)

(56) References Cited

U.S. PATENT DOCUMENTS 5,186,000 A * 2/1993 Hirata .................. E02F 9/2225
60/420
5,558,004 A * 9/1996 Stellwagen ........... F15B 11/163
91/447

(Continued)

FOREIGN PATENT DOCUMENTS

CN    202988589 U    6/2013
CN    103807232 A    5/2014
(Continued)

OTHER PUBLICATIONS

International Search Report dated Jun. 12, 2016, in the International Application No. PCT/US2016/075399, 3 pages.

*Primary Examiner* — Atif Chaudry
(74) *Attorney, Agent, or Firm* — Wilmer Cutler Pickering Hale and Dorr LLP

(57) ABSTRACT

The present application relates to a switching valve, a switching hydraulic system, and a crane, in which the switching valve having an oil inlet and an oil outlet comprises at least two pairs of valve oil ports, a pair of cartridge valves provided between each pair of valve oil ports, and the oil inlet and the oil outlet are controlled such that the oil inlet and the oil outlet are capable of shifting between communications with the at least two pairs of valve oil ports. The (Continued)

switching valve switches on and off communication between the oil inlet and the oil outlet and the at least two pairs of valve oil ports by controlling opening or closing of the cartridge valves.

7 Claims, 5 Drawing Sheets

(51) Int. Cl.
*F16K 31/06* (2006.01)
*F16K 27/00* (2006.01)
*F15B 1/16* (2006.01)
*F15B 13/04* (2006.01)
*F15B 13/02* (2006.01)
*F15B 13/08* (2006.01)
*B66D 1/44* (2006.01)
*B66F 9/22* (2006.01)

(52) U.S. Cl.
CPC ............ *F15B 13/02* (2013.01); *F15B 13/021* (2013.01); *F15B 13/024* (2013.01); *F15B 13/027* (2013.01); *F15B 13/0402* (2013.01); *F16K 27/003* (2013.01); *F16K 31/0613* (2013.01); *F16K 31/1245* (2013.01); *F15B 13/0835* (2013.01); *F15B 2211/20546* (2013.01); *F15B 2211/30525* (2013.01); *F15B 2211/329* (2013.01); *F15B 2211/6355* (2013.01); *Y10T 137/7761* (2015.04); *Y10T 137/7762* (2015.04); *Y10T 137/86027* (2015.04); *Y10T 137/86614* (2015.04); *Y10T 137/87169* (2015.04); *Y10T 137/87177* (2015.04)

(58) Field of Classification Search
CPC ........ F15B 2211/30525; F15B 13/0835; F15B 2211/20546; F15B 2211/329; F15B 2211/6355; F15B 13/0402; F16K 17/01; F16K 27/003; F16K 31/0613; F16K 31/1245; Y10T 137/7761; Y10T 137/87169; Y10T 137/7762; Y10T 137/86614; Y10T 137/87177; Y10T 137/87209; Y10T 137/86027
See application file for complete search history.

(56) References Cited

U.S. PATENT DOCUMENTS

| | | | | |
|---|---|---|---|---|
| 5,832,807 A | * | 11/1998 | Rausch | B23D 15/14 60/468 |
| 6,253,658 B1 | * | 7/2001 | Kimura | E02F 9/226 91/447 |
| 8,522,541 B2 | | 9/2013 | Yamagata | |
| 9,797,117 B2 | * | 10/2017 | Kubo | E02F 9/2285 |
| 2005/0138924 A1 | * | 6/2005 | Kodama | E02F 9/2228 60/456 |
| 2008/0054203 A1 | * | 3/2008 | Andersson | F15B 13/01 251/26 |
| 2009/0293971 A1 | * | 12/2009 | Stretch | F16K 1/126 137/625.11 |
| 2010/0205955 A1 | * | 8/2010 | Yamagata | B66D 1/44 60/484 |
| 2010/0243927 A1 | * | 9/2010 | Wahlefeld | F15B 11/006 251/57 |
| 2010/0319337 A1 | * | 12/2010 | Jene | F15B 11/0445 60/459 |
| 2012/0280152 A1 | * | 11/2012 | Schmidt | F15B 11/006 251/25 |
| 2014/0130488 A1 | * | 5/2014 | Sugano | B66D 1/44 60/459 |
| 2015/0096291 A1 | * | 4/2015 | Takeuchi | E02F 9/2203 60/460 |
| 2015/0135698 A1 | * | 5/2015 | Stephan | F15B 11/006 60/428 |
| 2015/0300380 A1 | * | 10/2015 | Ueda | F15B 11/0413 60/462 |
| 2015/0369262 A1 | * | 12/2015 | Kubo | F15B 11/044 137/565.01 |
| 2016/0032947 A1 | * | 2/2016 | Tanaka | F15B 11/003 60/429 |
| 2016/0108936 A1 | * | 4/2016 | Wang | B66C 13/066 91/426 |
| 2017/0022688 A1 | * | 1/2017 | Kubo | E02F 3/422 |

FOREIGN PATENT DOCUMENTS

| | | |
|---|---|---|
| CN | 103896156 A | 7/2014 |
| CN | 204111196 U | 1/2015 |
| CN | 104632746 A | 5/2015 |
| EP | 1163454 A1 | 12/2001 |
| EP | 1172325 A2 | 1/2002 |

* cited by examiner

Figure 1 – Prior Art

SWITCHING VALVE, SWITCHING HYDRAULIC SYSTEM AND CRANE

CROSS REFERENCE TO RELATED APPLICATIONS

This application is a national stage application of PCT International Application No. PCT/CN2016/075399, filed Mar. 3, 2016, which claims priority to CN Application No. 201510096747.6, filed Mar. 4, 2015, the contents of which are incorporated herein by reference in their entirety.

TECHNICAL FIELD

The present application relates to the field of an engineering machinery, especially relates to a switching valve, a switching hydraulic system and a crane.

BACKGROUND ART

In the field of engineering machinery, the crane is a commonly used hoisting engineering machinery related equipment. With continuous progress of technology, the crane develops rapidly toward a direction of lightweight and intelligence, so that it is necessary to require technical staff to uphold the design concept of lightweight at all times in the design process. As one of the core components of the crane, the hydraulic system is required to be as concise as possible, and the elements in use to be in less amount and light weight.

The hydraulic system of the crane is functionally divided into an upper part hydraulic system and an lower part hydraulic system. The upper part hydraulic system, which is mainly used during operation of the crane, comprises a luffing system, a telescopic system, a winch system, a revolving system, an auxiliary system and so on; the lower part hydraulic system, which is mainly used in a running state, comprises an outrigger system, a suspension system, a steering system, a cooling system and so on.

The hydraulic system of the crane is principally divided into an open system and a closed system. The oil passage of the open system is in a way such that a hydraulic pump sucks oil from an oil tank and reaches an actuation element via a control valve, and oil discharged by the actuation element returns to the oil tank in which the oil may be cooled, and the open system is a common manner of a hydraulic system. The oil passage of the closed system is in a way such that a hydraulic pump inputs oil into an oil inlet of the actuating element, and oil discharged from the actuating element is directly supplied to an oil suction port of the hydraulic pump. A variable displacement pump is used for changing a direction. Although the circuit mechanism is compact, the cooling condition is poor so that it is necessary to provide an oil supplementing circuit to supplement leakage in the circuit. A crane below a hundred-tonnage level mainly use an open system, i.e. one or more main pumps for telescoping, luffing, winching, and revolving system actions. The products of above a hundred-tonnage level mainly use a coexistent manner of an open system and a closed system, in which the open system is mainly used in telescopic, luffing and auxiliary circuits, while the closed system is applied in a revolving system and a winch system (including a main winch system, a secondary winch system, and a tower arm winch system). However, the closed system is generally in a way such that a pump corresponds to an action, thus resulting in a large amount of pumps in the entire hydraulic system. Take a crane of some tonnage for instance, the upper part hydraulic system has as many as nine pumps.

The existing winch and revolving systems of a crane, which are shown in FIG. 1, respectively use an independent closed system. Among them, in order to ensure that the winch system has a wider speed governing range, most of the winch motors are variable displacement motors, while the revolving system needs to have a better micro-movement, the revolving motor mainly is a constant displacement motor. In FIG. 1, a1 and a2 are closed pumps, a3 is a winch motor, a4 is a revolving motor, a5 and a6 are both brakes, a7 is a brake control valve, a8 is a buffer valve, a9 is a slip valve. The closed pump a1 directly drives the winch motor a3 to effectuate an action of the secondary winch (tower arm winch) and the closed pump a1 does not participate in operation of other systems. The closed pump a2 alone directly drives the revolving motor a4, so as to achieve a revolving action, and the closed pump a2 likewise does not participate in operation of other systems.

Thus, the existing hydraulic systems of a crane are at least present with the following technical defects:

(1) Revolving and secondary winch (tower arm winch) are driven respectively using different pumps so that the pumps are in large amount and great volume, which results in heavy weight of complete vehicle.

(2) The pumps at a pump set are in large amount, the pipeline of the pump set accessory is subjected to a great connection difficulty, and the connection pipeline is complicated, which results in high cost of the hydraulic systems.

CONTENTS OF THE APPLICATION

In order to overcome the above technical defects, the technical problem solved by the present application is to provide a switching valve which enables a closed pump to switch between at least two closed systems of a crane, to reduce the amount of pumps of a hydraulic system, thereby lowering the cost of a hydraulic system and the weight of a complete vehicle.

In order to solve the aforementioned technical problem, the present application provides a switching valve having an oil inlet and an oil outlet, the switching valve comprises at least two pairs of valve oil ports, a pair of cartridge valves are provided between each pair of valve oil ports, and the oil inlet and the oil outlet, opening or closing of the cartridge valves is controlled such that the oil inlet and the oil outlet are capable of switching between communications with the at least two pairs of valve oil ports; the switching valve further comprises a control oil passage for controlling opening or closing of the cartridge valves and a reversing valve for controlling a heading of the control oil passage, the reversing valve is controlled to change a heading of the control oil passage so as to effectuate opening or closing of the cartridge valves; the control oil passage comprises a supplying oil passage and a pressure relief oil passage for respectively supplying oil and relieving pressure for a control port of the cartridge valves; the supplying oil passage supplies oil to the cartridge valves, through a flow dividing point located before or after the reversing valve.

In the basic technical solution, by controlling cartridge valves provided between each pair of valve oil ports and the oil inlet and the oil outlet, opening or closing of the cartridge valves is controlled to switch on and off communication between the oil inlet and the oil outlet and the at least two pairs of valve oil ports, thereby effectuating stably shifting between communications of a system hydraulic pump with at least two closed systems, and compared with the current supplying manner of providing respective corresponding hydraulic system pumps for different closed system, significantly reducing the cost of the hydraulic system and the weight of the complete vehicle by lessening the amount of hydraulic system pumps. Moreover, the cartridge valves are highly stable in switching on and off the oil passage so that the switching valve presents a high reliability; the reversing valve is utilized to change a heading of the control oil passage and subsequently effectuate controlling opening or closing of different cartridge valves, thus conveniently effectuating shifting between communications of the oil inlet and the oil outlet with the at least two pairs of valve oil ports; the supplying oil passage supplies oil for a control port of the cartridge valves to close the cartridge valves so that the oil passage is off, and the pressure relief oil passage relieves pressure for a control port of the cartridge valves so that pressure oil can actuate the cartridge valves and subsequently open the oil passage; by providing a flow dividing point on a control oil passage after the reversing valve, the amount of the reversing valve can be reduced, thereby further simplifying the structure of the switching valve.

Further, the oil inlet communicates with the supplying oil passage, so as to effectuate controlling opening or closing of the cartridge valves by supplying of the oil inlet and reversing of the reversing valve.

In the improved technical solution, by communicating the oil inlet with the supplying oil passage, pressure oil entering the oil inlet provides oil pressure of the control oil passage, thereby reducing provision of an externally controlled oil passage to control opening or closing of the cartridge valves so that the structure of the switching valve is simplified.

Further, the switching valve further comprises an oil inlet check valve and an oil return check valve, the oil inlet and the oil outlet respectively communicating with an oil inlet port of the oil inlet check valve and the oil return check valve, the supplying oil passage communicating with an oil return port of the oil inlet check valve and the oil return check valve.

In the improved technical solution, by respectively providing an oil inlet check valve and an oil return check valve at the oil inlet and the oil outlet, the oil inlet and the oil outlet can realize interchange, thereby significantly promoting the adaptability of the switching valve.

Further, the switching valve further comprises a damper provided on a control port of the cartridge valves.

In the improved technical solution, the damper can improve the dynamic behavior of opening or closing the cartridge valves so that the cartridge valves act stably, thereby further improving the reliable stability of the switching valve.

The present application further provides a switching hydraulic system comprising the aforementioned switching valve.

In the basic technical solution, the switching hydraulic system comprising the aforementioned switching valve correspondingly presents the aforementioned advantageous technical effect.

Preferably, the switching hydraulic system further comprises a closed pump, a winch motor and a revolving motor, a motor oil inlet port and a motor oil return port of the winch motor and the revolving motor respectively communicating with two pairs of valve oil ports of the switching valve.

In the preferred technical solution, the two pairs of valve oil ports of the switching valve respectively communicate with the motor oil inlet port and the motor oil return port of the winch motor and the revolving motor so that a closed pump is capable of supplying oil respectively for the winch motor and the revolving motor, and the cost of the hydraulic system is greatly reduced by lessening the amount of the closed pump.

The present application also further provides a crane comprising the aforementioned switching hydraulic system.

In the basic technical solution, the crane comprising the aforementioned switching hydraulic system also correspondingly presents the aforementioned advantageous technical effect.

Accordingly, on the basis of the aforementioned technical solution, the present application provides a switching valve which switches on and off communication between the oil inlet and the oil outlet and the at least two pairs of valve oil ports by controlling opening or closing of the cartridge valves, thereby stably effectuating shifting between communications of a system hydraulic pump with at least two closed systems, and significantly reducing the cost of the hydraulic system and the weight of the complete vehicle by lessening the amount of hydraulic system pumps and the switching valve presents a high reliability. Further, by communicating the oil inlet with the supplying oil passage, the oil inlet is capable of supplying oil for the control oil passage, thereby optimizing a control manner of opening or closing the cartridge valves and further simplifying the structure of the switching valves. The switching hydraulic system and the crane provided by the present application also correspondingly present the aforementioned advantageous technical effect.

BRIEF DESCRIPTION OF THE DRAWINGS

The drawings described herein are used to provide a further understanding of the present application and constitute a part of the present application. The illustrative embodiments of the present application as well as the descriptions thereof, which are merely used for explaining the present application, do not constitute improper definitions on the present application. In the drawings:

FIG. 1 is a schematic view of the structure of winch and revolving systems of an existing crane;

EMBODIMENTS

Next, the technical solution of the present application is further described in detail by means of the drawings and embodiments.

The specific embodiments of the present application are further described in order to facilitate understanding of the concept of the present application, the technical problem to be solved, the technical features constituting the technical solution and the technical effect produced. It is necessary to explain that, the explanations for such embodiments do not constitute definitions on the present application. In addition, the technical features involved in the embodiments of the present application described below may be combined with each other as long as they do not constitute a conflict.

As the existing hydraulic system of a crane is respectively driven using different pumps so that the pumps are in large amount and great volume, which results in high cost of the hydraulic system and heavy weight of complete vehicle, the present application designs a switching valve which switches on and off communication between the oil inlet and the oil outlet and the at least two pairs of valve oil ports by controlling opening or closing of the cartridge valves, thereby stably effectuating shifting between communications of a system hydraulic pump with at least two closed systems, and significantly reducing the cost of the hydraulic system and the weight of the complete vehicle by lessening the amount of hydraulic system pumps and the switching valve presents a high reliability.

Figure 2:
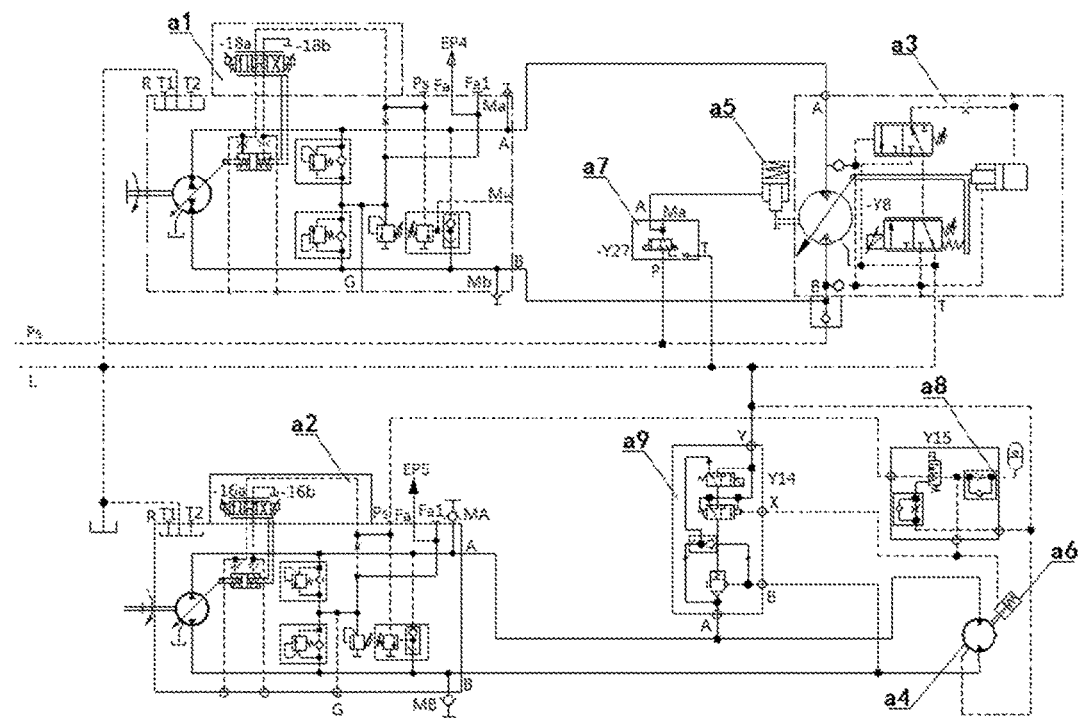
FIG. 2 is a schematic view of the structure for an embodiment of the switching valve according to the present application under the first switching mode.
Figure 3:
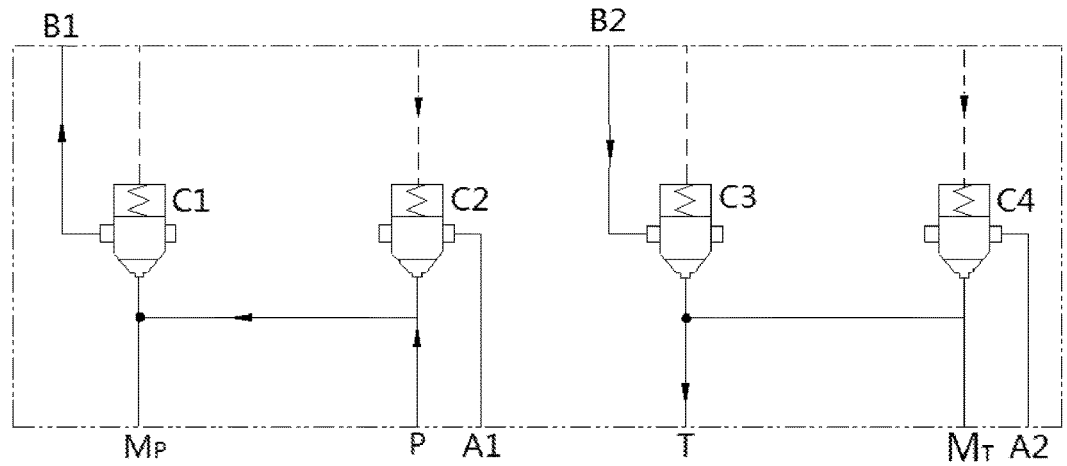
FIG. 3 is a schematic view of the structure for an embodiment of the switching valve according to the present application under the second switching mode.

In an illustrative embodiment of the present application, as shown in FIGS. 2 and 3, the switching valve having a oil inlet P and a oil outlet T, comprises two pairs of valve oil ports including a first pair of valve oil ports [A1, A2] and a second pair of valve oil ports [B1, B2] as well as an oil inlet pressure measuring port MP and an oil outlet pressure measuring port MT respectively communicating with the oil inlet P and the oil outlet T. The first pair of valve oil ports [A1, A2] comprises a first valve oil inlet port A1 and a first valve oil return port A2, and the second pair of valve oil ports [B1, B2] comprises a second valve oil inlet port B1 and a second valve oil return port B2. A first cartridge valve C1 and a second cartridge valve C2 are respectively provided between the oil inlet P, and the second valve oil inlet port B1 and the first valve oil inlet port A1, and a third cartridge valve C3 and a fourth cartridge valve C4 are respectively provided between the oil outlet T, and the second valve oil return port B2 and the first valve return inlet port A2. As shown in FIG. 2, by supplying oil to the control port so that the first cartridge valve C1 and the third cartridge valve C3 are closed, the second cartridge valve C2 and the fourth cartridge valve C4 are actuated under the effect of pressure oil, two main oil ports of the second cartridge valve C2 and the fourth cartridge valve C4 both communicate, subsequently allowing that the oil inlet P communicates with the first valve oil inlet port A1, and the oil outlet T communicates with the first valve oil return port A2. As shown in FIG. 3, by supplying oil for the control port so that the second cartridge valve C2 and the fourth cartridge valve C4 are closed, the first cartridge valve C1 and the third cartridge valve C3 are actuated under the effect of pressure oil, two main oil ports of the first cartridge valve C1 and the third cartridge valve C3 both communicate, subsequently allowing that the oil inlet P communicates with the second valve oil inlet port B1, and the oil outlet T communicates with the second valve oil return port B2.

In the illustrative embodiment, by respectively controlling the first cartridge valve C1, the second cartridge valve C2, the third cartridge valve C3 and the fourth cartridge valve C4 provided among the first pair of valve oil ports [A1, A2] and the second pair of valve oil ports [B1, B2] and the oil inlet P and the oil outlet T, opening or closing of the cartridge valves are utilized to switch on and off communications among the oil inlet P and the oil outlet T and the first pair of valve oil ports [A1, A2] and the second pair of valve oil ports [B1, B2], such that the oil inlet P and the oil outlet T are capable of shifting between communications with the first pair of valve oil ports [A1, A2] and the second pair of valve oil ports [B1, B2], thereby effectuating stably shifting between communications of a system hydraulic pump with two closed systems, and compared with the current supplying manner of providing respective corresponding hydraulic system pumps for different closed system, significantly reducing the cost of the hydraulic system and the weight of the complete vehicle by lessening the amount of hydraulic system pumps. Moreover, the cartridge valves are highly stable in switching on and off the oil passage so that the switching valve presents a high reliability.

Figure 4:
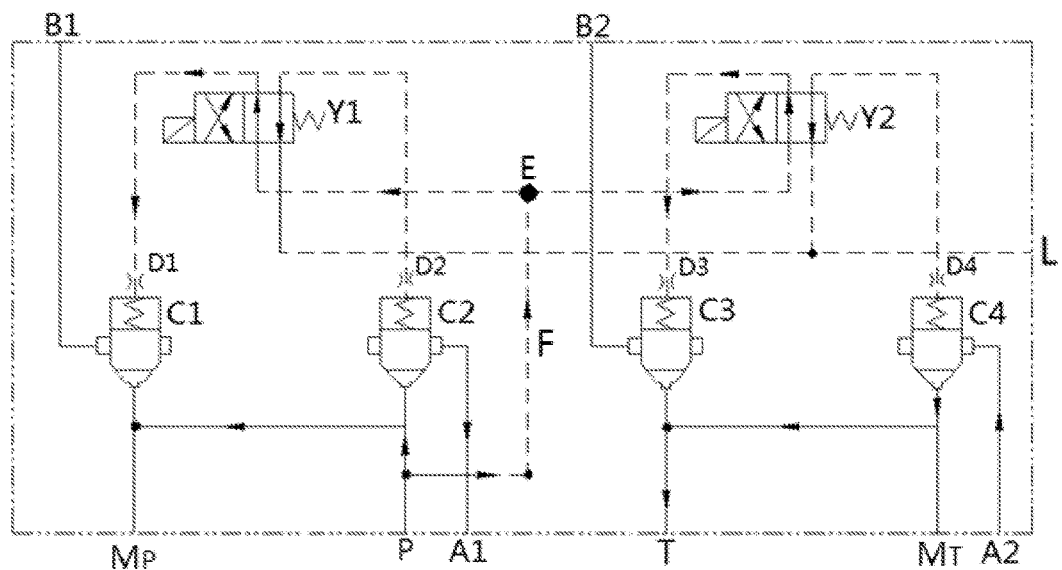
FIG. 4 is a schematic view of the structure for another embodiment of the switching valve according to the present application when the reversing valve is not energized.
Figure 5:
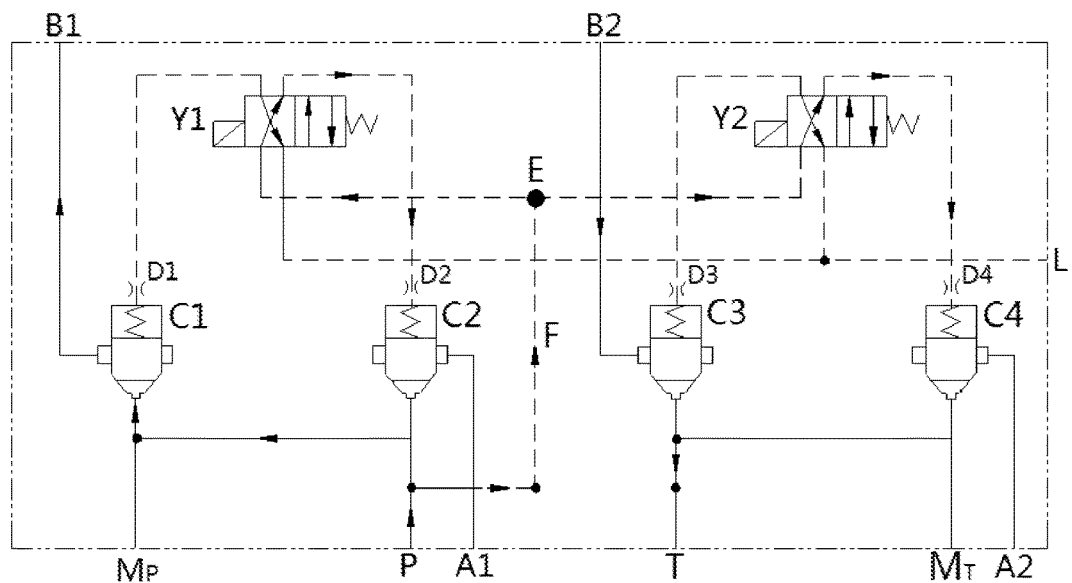
FIG. 5 is a schematic view of the structure for another embodiment of the switching valve according to the present application when the reversing valve is energized.

As an improvement to the illustrative embodiment, in a preferred illustrative embodiment, as shown in FIGS. 4 and 5, the switching valve further comprises a control oil passage for controlling opening or closing of the cartridge valves, a reversing valve for controlling a heading of the control oil passage, as well as a first damper D1, a second damper D2, a third damper D3, and a fourth damper D4 respectively provided on control ports of the first cartridge valve C1, the second cartridge valve C2, the third cartridge valve C3, and the fourth cartridge valve C4, The damper can improve the dynamic behavior of opening or closing the cartridge valves so that the cartridge valves act stably, thereby further improving the reliable stability of the switching valve. Among them, the supplying oil passage F supplies oil to a corresponding control oil passage of the cartridge valves through a flow dividing point E located before the reversing valve. The reversing valve comprises a first reversing valve Y1 controlling headings of control oil passages of the first cartridge valve C1 and the second cartridge valve C2, and a second reversing valve Y2 controlling headings of control oil passages of the third cartridge valve C3 and the fourth cartridge C4. The first reversing valve Y1 and the second reversing valve Y2 are preferably two-position four-way electromagnetic reversing valves. Different shifting requirements can be satisfied by providing a flow dividing point on a control oil passage before a reversing valve.

As shown in FIG. 4, when the first reversing valve Y1 and the second reversing valve Y2 are not energized, the control ports of the first cartridge valve C1 and the third cartridge valve C3 which are filled with oil are closed, the control ports of the second cartridge valve C2 and the fourth cartridge valve C4 which are not filled with oil, and the second cartridge valve C2 and the fourth cartridge valve C4 are opened under the effect of pressure oil entering from main oil ports of the second cartridge valve C2 and the fourth cartridge valve C4, so that the oil inlet P communicates with the first valve oil inlet port A1, and the oil outlet T communicates with the first valve oil return port A2. As shown in FIG. 5, when the first reversing valve Y1 and the second reversing valve Y2 are energized, the control oil passage is changed in direction, the second cartridge valve C2 and the fourth cartridge valve C4 are closed as the control ports of them are filled with oil, the first cartridge valve C1 and the third cartridge valve C3 are open under the effect of pressure oil entering from main oil ports of them as the control ports of them are not filled with oil, so that the oil inlet P communicates with the second valve oil inlet port B1, and the oil outlet T communicates with the second valve oil return port B2. The first reversing valve Y1 and the second reversing valve Y2 are utilized to change a heading of the control oil passage and subsequently effectuate controlling opening or closing of different cartridge valves, thus conveniently effectuating shifting between communications of the oil inlet P and the oil outlet T with the first pair of valve oil ports [A1, A2] and the second pair of valve oil ports [B1, B2].

Figure 6:
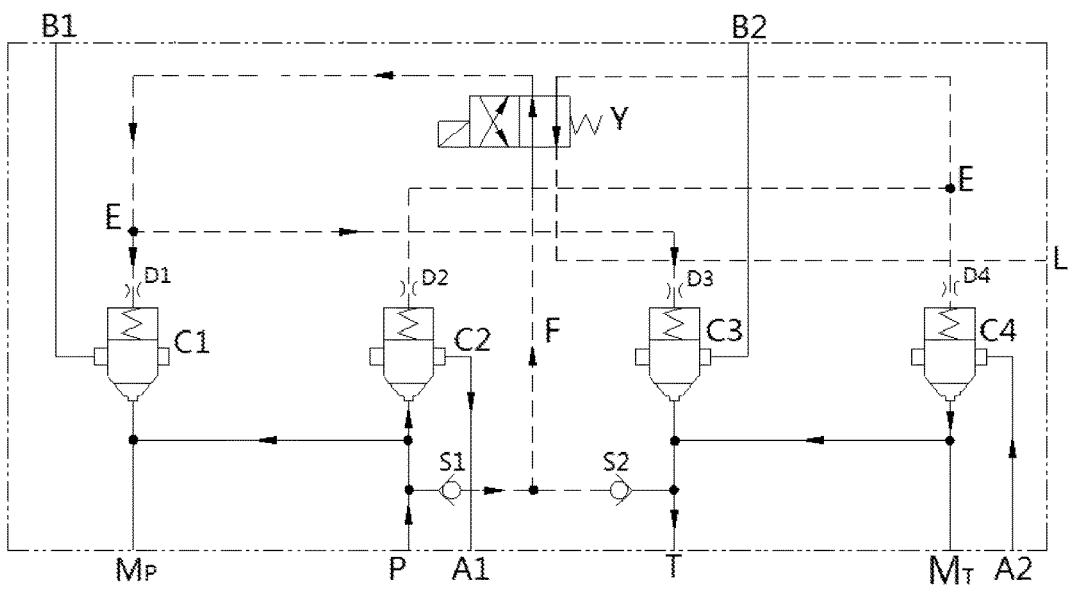
FIG. 6 is a schematic view of the structure for a further embodiment of the switching valve according to the present application when the reversing valve is not energized.
Figure 7:
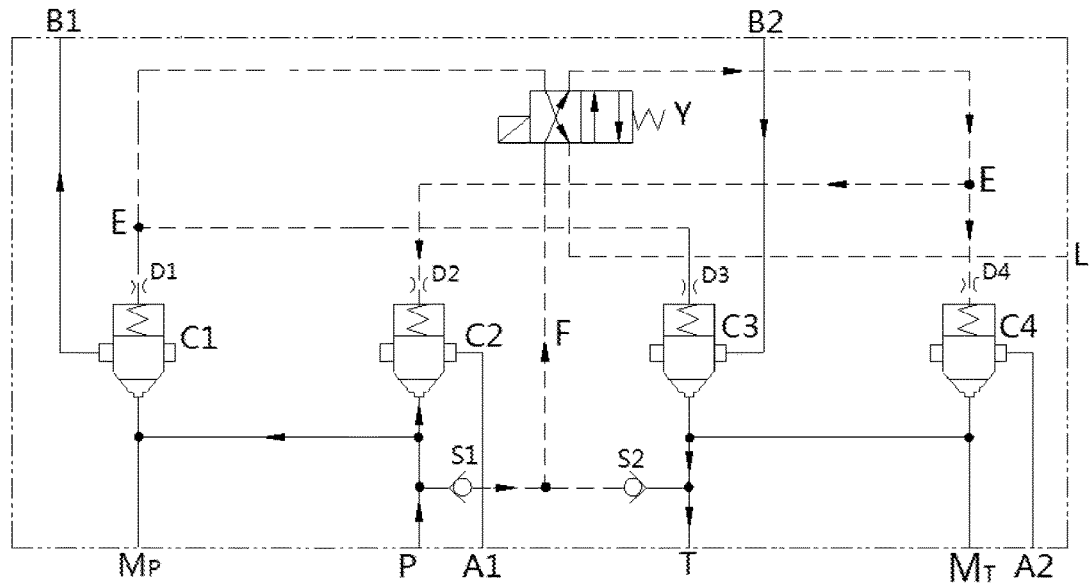
FIG. 7 is a schematic view of the structure for a further embodiment of the switching valve according to the present application when the reversing valve is energized.
Figure 8:
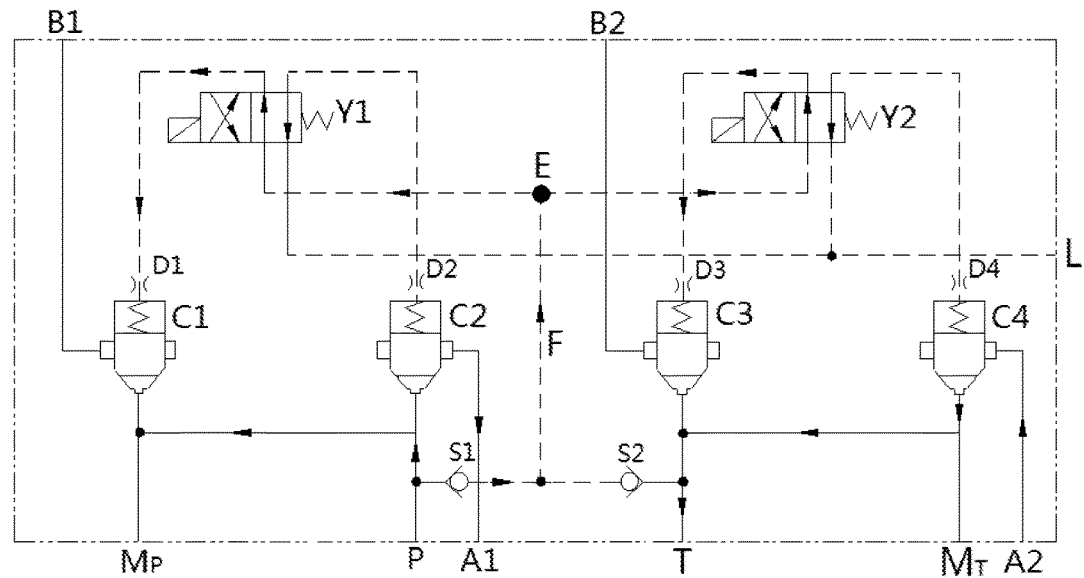
FIG. 8 is a schematic view of the structure for an improved embodiment of the switching valve according to the present application when the reversing valve is not energized.
Figure 9:
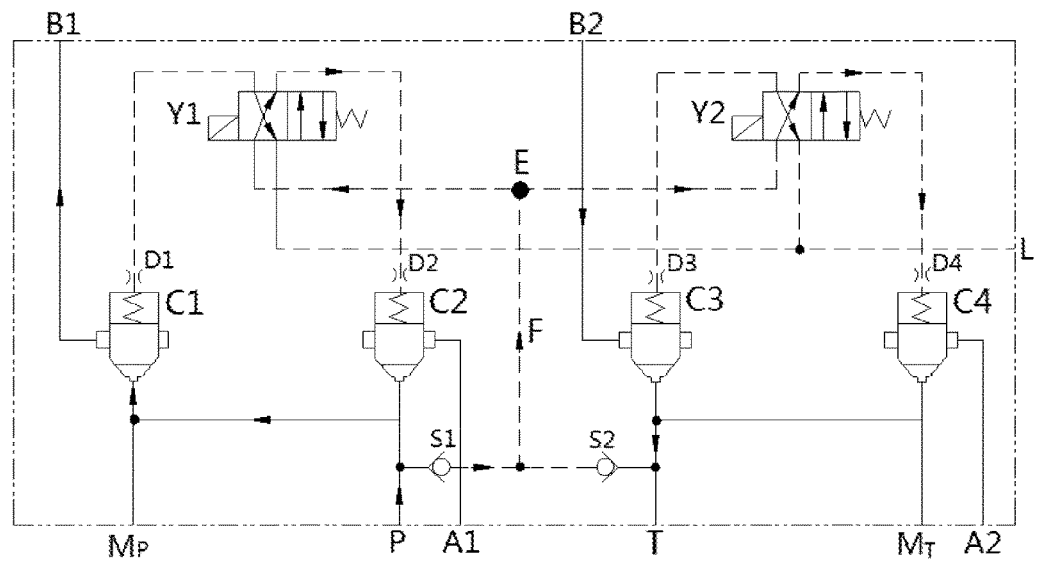
FIG. 9 is a schematic view of the structure for an improved embodiment of the switching valve according to the present application when the reversing valve is energized.

In an alternative embodiment of the above-described preferred illustrative embodiment, as shown in FIGS. 6 and 7, unlike the above-described preferred embodiment, the flow dividing point E is located after the reversing valve and the switching valve comprises one reversing valve, i.e. one oil port of the reversing valve y controls headings of control oil passages of the first cartridge valve C1 and the third cartridge valve C3, and the other oil port of the reversing valve y controls headings of control oil passages of the second cartridge valve C2 and the fourth cartridge valve C4. By providing a flow dividing point E on a control oil passage after the reversing valve, the amount of the reversing valve can be reduced, thereby further simplifying the structure of the switching valve. The flowing dividing point E is in the downstream of the reversing valve.

Further, as shown in FIGS. 4 and 5, the control oil passage comprises a supplying oil passage F and a pressure relief oil passage L for respectively supplying oil and relieving pressure to control ports of the first cartridge valve C1, the second cartridge valve C2, the third cartridge valve C3 and the fourth cartridge valve C4. The supplying oil passage supplies oil to a control port of the cartridge valves to close the cartridge valves so that the oil passage is off, and the pressure relief oil passage relieves pressure for a control port of the cartridge valves so that pressure oil can actuate the cartridge valves, subsequently such that the oil passage is opened after the first reversing valve Y1 and the second reversing valve Y2 are shifted.

As a further improvement to the aforementioned embodiment, as shown in FIGS. 4 and 5, the oil inlet P communicates with the supplying oil passage F, so as to effectuate controlling opening or closing of the cartridge valves by supplying of the oil inlet P and reversing of the reversing valve. By communicating the oil inlet P with the supplying oil passage F, pressure oil entering the oil inlet P provides oil pressure of the control oil passage, thereby reducing provision of an externally controlled oil passage to control opening or closing of the cartridge valves so that the structure of the switching valve is simplified.

Further, as shown in FIG. 6~FIG. 9, the switching valve further comprises an oil inlet check valve S1 and an oil return check valve S2, the oil inlet P and the oil outlet T respectively communicating with the oil inlet port of the oil inlet check valve S1 and the oil return check valve S2, the supplying oil passage F communicating with the oil return port of the oil inlet check valve S1 and the oil return check valve S2. By respectively providing an oil inlet check valve S1 and an oil return check valve S2 at the oil inlet P and the oil outlet T, the oil inlet P and the oil outlet T can realize interchange, i.e. the oil inlet P may return oil as an oil outlet, and the oil outlet T may intake oil as an oil inlet. Correspondingly, the first valve oil inlet port A1 and the first valve oil return port A2 are interchangeable, and the second valve oil inlet port B1 and the second valve oil return port B2 are also interchangeable, thereby significantly promoting the adaptability of the switching valve.

Figure 10:
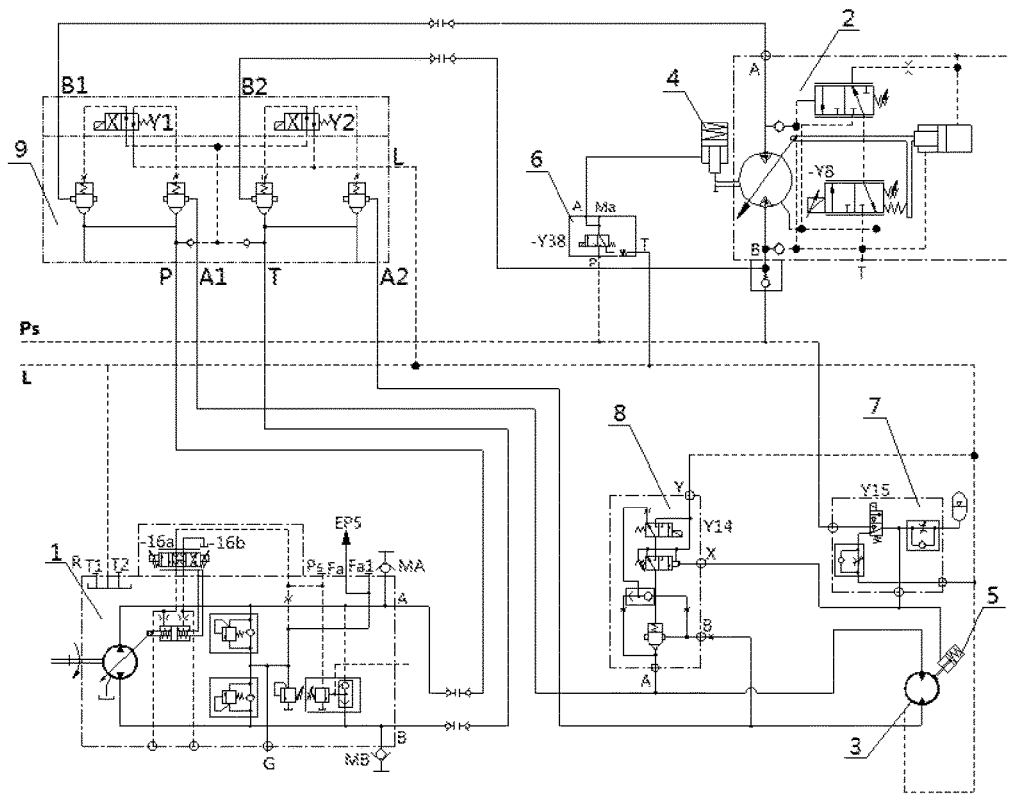
FIG. 10 is a schematic view of the structure of the switching hydraulic system according to the present application.

The present application further provides a switching hydraulic system comprising the aforementioned switching valve 9 as shown in FIG. 10. Specifically, in a preferred illustrative embodiment of the switching hydraulic system of the present application, as shown in FIG. 10, the switching hydraulic system includes a closed pump 1, a winch motor 2, a revolving motor 3, a winch brake 4, a winch brake 5, a brake control valve 6, a buffer valve 7, a slip valve 8, and a switching valve 9. The oil inlet P and the oil outlet T of the switching valve 9 and the closed pump 1 communicate, the motor oil inlet port and the motor oil return port of the winch motor 2 and the revolving motor 3 respectively communicate with the second pair of valve oil ports [B1, B2] and the first pair of valve oil ports [A1, A2] of the switching valve 9. When the first reversing valve Y1 and the second reversing valve Y2 are both not energized, the oil inlet P communicates with the first valve oil inlet port A1, the oil outlet T communicates with the first valve oil return port A2, and the closed pump 1 supplies oil for the revolving motor 3. When the first reversing valve Y1 and the second reversing valve Y2 are both energized, the control oil passage is changed in direction so that the oil inlet P communicates with the second valve oil inlet port B1, the oil outlet T communicates with the second valve oil return port B2, and the closed pump 1 supplies oil for the winch motor 2. The switching valve 9 allows that a closed pump 1 is capable of supplying oil respectively for the winch motor 2 and the revolving motor 3, and the cost of the hydraulic system is greatly reduced by lessening the amount of the closed pump 1.

The present application also further provides a crane comprising the aforementioned switching hydraulic system. The switching hydraulic system, which is capable of allowing a closed pump to shift between two closed systems of a crane, reduces the amount of pumps of a hydraulic system, and lowers the cost of a hydraulic system and the weight of a complete vehicle. Correspondingly, the crane comprising the aforementioned switching hydraulic system also correspondingly presents the aforementioned advantageous technical effect, and thus is no longer repeated here.

The above-combined embodiments make detailed explanations for the embodiments of the present application, but the present application is not limited to the embodiments described. For example, the valve oil port may also be provided in multiple pairs (for example, three pairs), and the amount of the reversing valve may also be freely provided according to its position relative to the flow dividing point E and a required shifting manner. For a person skilled in the art, multiple changes, modifications, equivalent replacements, and variations made to such embodiments still fall within the protection scope of the present application without departing from the principles and substantive spirit of the present application.

What is claimed is:

1. A switching valve having an oil inlet and an oil outlet, comprising at least two pairs of valve oil ports, said at least two pairs of valve oil ports comprises a first pair of valve oil ports and a second pair of valve oil ports, said first pair of valve oil ports comprises a first valve oil inlet port and a first valve oil return port, a first cartridge valve is provided between said first valve oil inlet port and said oil inlet, a second cartridge valve is provided between said first valve oil return port and said oil outlet, said second pair of valve oil ports comprises a second valve oil inlet port and a second valve oil return port, a third cartridge valve is provided between said second valve oil inlet port and said oil inlet, a fourth cartridge valve is provided between said second valve oil return port and said oil outlet; said switching valve further comprising:
- a supplying oil passage for supplying oil to a control port of said first cartridge valve, a control port of said second cartridge valve, a control port of said third cartridge valve, and a control port of said fourth cartridge valve; and
- a pressure relief oil passage for relieving pressures on the control port of said first cartridge valve, the control port of said second cartridge valve, the control port of said third cartridge valve and the control port of said fourth cartridge valve;
- said switching valve further comprising a reversing valve, said reversing valve communicates with said first cartridge valve and said second cartridge valve through a first flow dividing point, and said reversing valve communicates with said third cartridge valve and said fourth cartridge valve through a second flow dividing point, and
- wherein said reversing valve is switchable between a first working position and a second working position; in the first working position, said reversing valve is controlled to communicate the supplying oil passage with the control port of said first cartridge valve and the control port of said second cartridge valve and to communicate the pressure relief oil passage with the control port of said third cartridge valve and the control port of said fourth cartridge valve; and in the second working position, said reversing valve is controlled to communicate the supplying oil passage with the control port of said third cartridge valve and the control port of said fourth cartridge valve and to communicate the pressure relief oil passage with the control port of said first cartridge valve and the control port of said second cartridge valve.

2. The switching valve according to claim 1, wherein said oil inlet communicates with said supplying oil passage to supply oil to said supplying oil passage.

3. The switching valve according to claim 2, further comprising an oil inlet check valve and an oil return check valve, an oil inlet port of said oil inlet check valve communicates with said oil inlet and an oil return port of said oil inlet check valve communicates with said supplying oil passage, an oil inlet port of said oil return check valve communicates with said oil outlet and an oil return port of said oil return check valve communicates with said supplying oil passage.

4. The switching valve according to claim 1, further comprising a first damper provided on the control port of said first cartridge valve, a second damper provided on the control port of said second cartridge valve, a third damper provided on the control port of said third cartridge valve and a fourth damper provided on the control port of said fourth cartridge valve.

5. A switching hydraulic system, comprising the switching valve according to claim 1.

6. The switching hydraulic system according to claim 5, further comprising a closed-type pump, a winch motor and a revolving motor, a motor oil inlet port of said winch motor communicates with the first valve oil inlet port and a motor oil return port of said winch motor communicates with the first valve oil return port; a motor oil inlet port of said revolving motor communicates with the second valve oil inlet port and a motor oil return port of said revolving motor communicates with the second valve oil return port.

7. A crane, comprising the switching hydraulic system according to claim 5.

* * * * *